May 22, 1923.
W. F. ZIEGLER
1,456,206
CORN HARVESTER
Filed Jan. 3, 1921
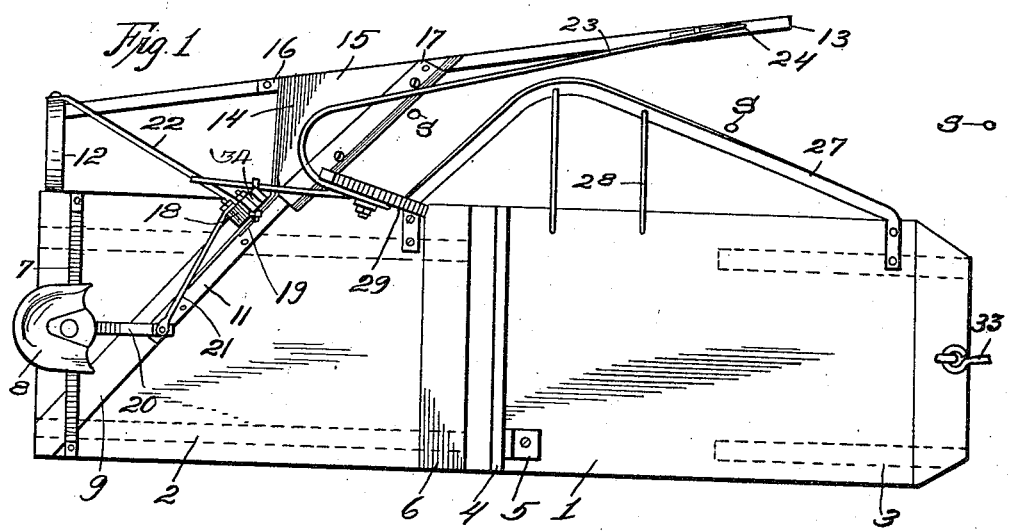
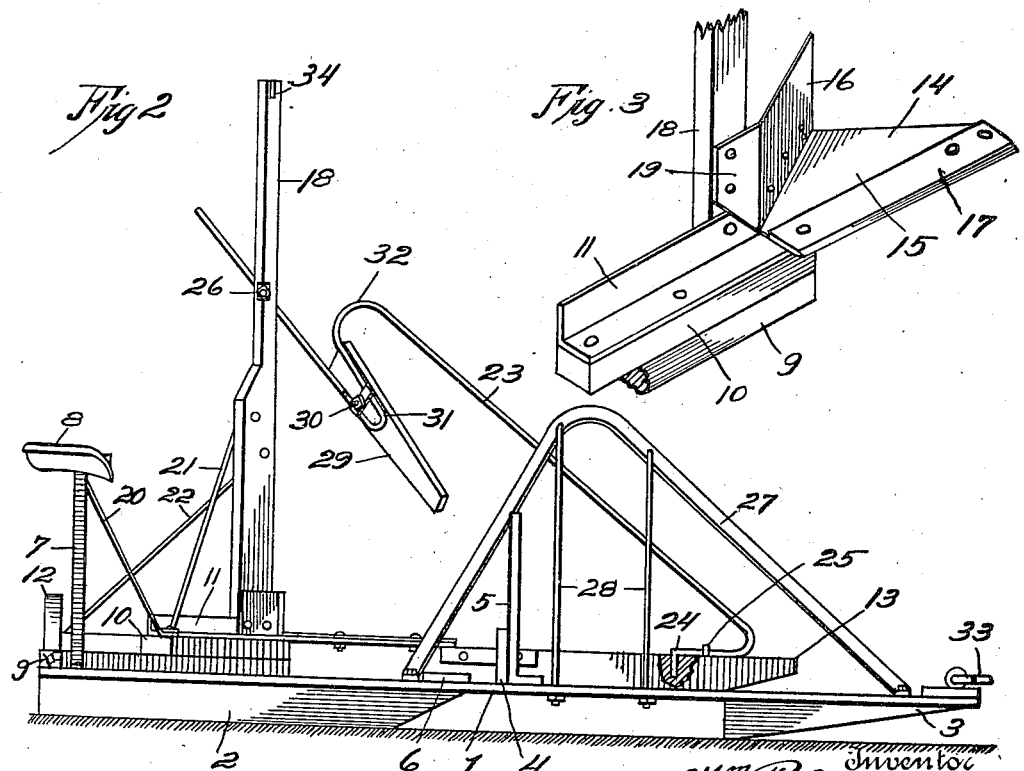
Witness:
R. E. Hamilton
Inventor
Wm. F. Ziegler
By Thorpe & Gerard
Attorney Patented May 22, 1923.

1,456,206

UNITED STATES PATENT OFFICE.

WILLIAM F. ZIEGLER, OF SALINA, KANSAS.

CORN HARVESTER.

Application filed January 3, 1921. Serial No. 434,408.

*To all whom it may concern:*

Be it known that I, WILLIAM F. ZIEGLER, a citizen of the United States, and resident of Salina, county of Saline, and State of Kansas, have invented a certain new and useful Improvement in Corn Harvesters, of which the following is a complete specification.

This invention relates to corn harvesters and has for its object to produce an implement of this character which will efficiently cut the stalks close to the surface of the ground, is operable with but one horse and which will efficiently load such stalks onto the harvester and retain them in such position.

Another object is to produce an implement of this character of simple, strong, durable, efficient and inexpensive construction; and in order that it may be understood, reference is to be had to the accompanying drawing, in which:

Figure 1 is a top plan view of the implement in proper relative position to a corn row.

Figure 2 is a side elevation of the implement, illustrating the removable runners at the rear end thereof.

Figure 3 is an enlarged perspective view of the butt board of the device and also illustrates the method of securing the knife into position thereon.

In the said drawing, where like reference characters identify corresponding parts in all of the Figures, 1 is a sledge provided at its rear end with runners 2 for a purpose which will hereinafter appear, and at its front end with fixed shoes 3 in order that the device shall ride over all ordinary obstructions in a field.

At a point substantially centrally of the implement is a cross beam 4 to maintain the cut stalks slightly elevated from the platform of the implement and secured at one end thereof is an upright 5 to prevent such stalks from being dislodged under the travel of the machine over the ground. At a point rearward of said beam 4 is a platform reinforcing strap 6.

Near the rear end of the machine a substantially V-shaped strap iron standard 7 is secured, which forms a support for an operator's seat 8. Extending from one rear corner of the sledge and resting and secured to the platform thereof is a beam 9, and secured thereon and about one-half the length thereof is a second beam 10 which carries an angle iron bar 11 extending to the side margin of the implement opposite from the rear corner of the sledge from which beam 9 extends.

Secured to the rear corner of the implement opposite from the corner from which the beam 9 extends, by means of an arch 12 is a guide beam 13 extending forwardly and at an angle to the sledge for a purpose hereinafter described. At a point about midway its length, the beam 13 is connected to the angle iron bracket 11 and thus to the sledge, by means of a butt board 14, preferably of sheet iron, and formed of a substantially triangular horizontal plate 15 and a vertical portion 16 against which the butts of the cut stalks will come in contact after they have been severed by a knife 17 secured to the horizontal portion of the butt board and projecting beyond the front edge thereof. In order to provide a brace for the vertical portion, an upright 18 is provided, to which the angle iron bracket 11 is secured and to which an extension 19 of the butt board is also secured.

The opposite end of the angle bracket is securely fastened in position by means of a seat brace 20, and extending from said point of securement is a brace rod 21 for the vertical upright 18, said upright being further strengthened by a brace rod 22, the opposite end of the latter being secured to the rear end of the guide beam 13.

In order to provide a guide for the stalks S, so that they shall come into suitable drawing contact with the knife, an inclined guide 23 is provided between the front end of guide beam 13 and the upright 18. The front end of said guide is doweled as at 24 into the beam 13, and is further secured therein by an eye bolt 25. The rod then continues upwardly and rearwardly from this point of attachment, to a point somewhat above the knife blade and is then bent forwardly and downwardly at an angle, and is finally rebent upwardly and rearwardly and is secured to the upright 18 by means of a clamp bolt 26, as shown.

In order to cooperate with the guide 23 in guiding the stalks into proper contact with the knife and also to materially raise any stalks which may be bent over or are growing out of line, a substantially inverted V-shaped guide 27 is secured at its ends to the sledge and leans obliquely upward and outwardly therefrom so as to overhang the space between the beam 13 and the adjacent margin of the sledge. The upper part or apex of said guide intersects the vertical plane of the row of corn stalks for the purpose of straightening any stalks leaning toward the sledge and cooperating with the guide 23 in bringing the outer portion of the knife against the stalks. To brace the guide 27 a pair of rods 28 are secured thereto and to the sledge at any convenient points, said braces sloping downwardly and toward the sledge and cooperating with the rear arm of guide 27 and another part hereinafter mentioned, in insuring the falling of the cut stalks upon the sledge in a position longitudinally thereof.

The operation of the device is substantially as follows: Stalks will be guided into a drawing engagement with the knife by the guides 23 and 27. Immediately after the stalk has been severed, the butt thereof will swing backwardly into contact with the butt board and the stalk at about the same time will come into contact with what may be termed a pocket portion 32 of guide 23 and will be thrown thereby downwardly and forwardly upon the downwardly and rearwardly extending arm of guide 27, which in conjunction with the inclined braces 28 will deflect it sidewise until it attains a position longitudinally of the sledge, the upright 5 constituting a guide preventing the stalk from rolling off the opposite edge of the implement and the cross beam 4 causing such stalk to assume a forwardly and downwardly inclined position in order that a rope or other device may be easily passed under the stalks when it is desired to remove the same from the seldge or for binding them when occupying such position.

In order that the guide 23 shall cooperate with guide 27 in the proper deposit of the cut stalks on the sledge, a guide arm 29 is clamped as at 30, to the loop 31 formed by the rebent portion of guide 23, and substantially overhangs the adjacent margin of the sledge and the lower portion of the rear arm of guide 27.

As a convenient means of drawing the implement across a field, it is provided with a draft bar 33 of any suitable type.

It will be apparent that the stubble will offer no obstruction to the progress of the machine as the arch 12 is sufficiently high to clear the upper ends of the stubble, and that should the latter be slightly out of line with the arch, the beam 13 will deflect them inwardly so that the arch shall pass over them.

For the convenience of the driver upon the seat and to avoid interference with the corn falling and accumulating properly on the sledge, the driving lines or reins may rest in a notch 34 formed in the upper end of the upright 18.

From the above description it will be apparent that I have produced an implement embodying the features of advantage set forth as desirable in the statement of the object of the invention, and while I have described and illustrated the preferred embodiment of the same, I reserve the right to all changes properly falling within the spirit and scope of the appended claim.

I claim:

In a corn harvester, the combination with a sledge, of an inverted V-shaped guide overhanging at one side thereof, a beam extending divergingly forward with respect to said sledge, a plate connecting the sledge and beam and provided with an upwardly projecting transverse butt-board portion, a cutting blade bridging the space between the sledge and beam and extending forwardly and outwardly toward the latter, an upright adjacent the inner end of the blade, a guide extending upwardly and rearwardly from a point adjacent the front end of the beam toward the upright, then downwardly and forwardly to form a pocket, and then upwardly and rearwardly to the upright, and means for securing the end of said guide to said upright.

In testimony whereof I hereunto affix my signature.

WILLIAM F. ZIEGLER.